United States Patent Office 3,850,896
Patented Nov. 26, 1974

3,850,896
PROCEDURE FOR THE PRODUCTION OF POLYMERS AND COPOLYMERS OF ISOBUTYLENE AND COMPOSITIONS OBTAINED
Aldo Priola, Sebastiano Cesca, and Giuseppe Ferraris, San Donato Milanese, and Mario Baccaredda Boy and Paolo Giusti, Pisa, Italy, assignors to Snam Progetti S.p.A., San Donato Milanese, Italy
No Drawing. Filed Nov. 15, 1972, Ser. No. 306,902
Claims priority, application Italy, Nov. 26, 1971, 31,722/71
Int. Cl. C08d 1/26, 3/04, 3/10
U.S. Cl. 260—85.3 R      5 Claims

ABSTRACT OF THE DISCLOSURE

A method is described for the polymerization of isobutylene and, in particular, the copolymerization of isobutylene and isoprene to produce butyl rubber, by contacting the monomers with a catalyst prepared from: (a) an organoaluminum compound (e.g. $Al(C_2H_5)_2Cl$) and (b) a haloid of an inorganic acid represented by the formula $Z_nMeX_mY_p$ in which Me is an element belonging to the 5th, 6th or 7th groups of the periodic system; $n$ and $m$ are whole numbers; $p$ is a whole number or zero; the sum of $2n+m+p$ is equal to the valency of said element; Z is oxygen or sulphur; X is a halogen atom; and Y is an organic residue (e.g. $SO_2Cl_2$), in a liquid reaction medium constituted by an aliphatic, aromatic, cycloaliphatic or halogenated hydrocarbon such as methyl chloride, and at a temperature in the range from $-10°$ to $10°$ C.

This invention refers to a procedure for the production of polymers and copolymers of isobutylene using a particular catalyst system which enables us to utilize higher reaction temperatures than those previously used industrially; it also enables us to obtain higher yields in polymers having a higher molecular weight and generally better properties, logically dependent upon the operative conditions selected and other factors known to the technical field itself.

More particularly, this invention refers to an invention for the production of butyl rubber.

It is well known that butyl rubber has been industrially produced by means of a process of copolymerization achieved by utilizing cationic type initiators. In particular, the copolymerization has been achieved utilizing $AlCl_3$ in ethyl chloride or methyl chloride solution at $-100°$ C.

The use of solid catalyst insoluble in common hydrocarbon solvents and only slightly soluble in chloride solvents, has created many difficulties in the realization of an efficacious control of this reaction. We note that the preparation of the catalyst solution was already somewhat complex, and that in general, it was realized by means of a passage of a current of ethyl chloride or methyl chloride on a bed of solid aluminum trichloride.

Also the subsequent determination of the concentration of the catalyst that is achieved through titration of the $AlCl_3$ is very complex and it often gives very unexpected results. It is evident from what we have mentioned above that in the past there has been much effort on the part of various researchers and industries interested in the production of this type of rubber, towards the discovery of a new catalyst system that would simultaneously solve the problems of the dosage for the catalyst and the raising of the temperature of polymerization without of course, compromising the properties of the rubber and, in particular, without lowering the value of the molecular weight. Recently, some researchers perfected a new soluble catalyst system that enables us to obtained butyl rubber with a high molecular weight at considerably higher temperatures than those normally used in industrial processes.

The system in question derives from a combination of a haloid of Friedel-Crafts modified, for example $AlEt_2Cl$, with an appropriate co-catalyst.

These haloids are not usually capable of initiating the polymerization of isobutylene by themselves, or of mixtures of isobutylene-diene monomers or other monomers, that normally polymerize with a cationic type mechanism.

The polymerization or copolymerization begins only when the co-catalyst is introduced. This cocatalyst may be composed of a substance able to produce protons such as, for example, HCl and other acids of Brönsted, or by a substance capable of supplying carbon ions, such as, for example, chloride or t-butyl. The assignee of this application also own a copending patent application Ser. No. 195,423, filed Nov. 3, 1971, pertaining to a procedure for the production of butyl rubber by means of the use of a catalyst system constituted by a reducing aluminum compound and by a co-catalyst capable of giving cations for interaction with the catalyst.

The co-catalyst may be a halogen introduced as such, or other interhalogenic compounds.

The process which has now been perfected by us, and which constitutes the subject of this application, presents all the advantages of the catalyst systems mentioned previously and which are essentially associated with considerable ease of the control of the polymerization reaction owing to the solubility of these catalysts in common organic solvents, so that whenever necessary, it is possible to operate with minimum quantities of solvent or even in its total absence, in which case the same non-reacted monomer functions as a diluent.

In respect to the processes using haloids of dialkyl-aluminum and strong acids, it also presents the advantage of obtaining products of higher molecular weight and even higher reaction temperatures. It also presents major regularity in the polymerization process, permitting in fact, a major control of the temperatures and therefore a higher regularity in the polymers produced.

Then, in respect to the systems using halogen solutions and interhalogenic compounds, it has the great advantage of being easier to handle with regard to the compounds used as catalyst. Besides, it has the still greater advantage of greater ease in adding the co-catalyst, eventually also during polymerization, as compared to the Brönsted acids, and it is more economical with regard to the co-catalysts composed of alkylic haloids, especially taking into account the high quality of purity that they must have.

Even though this application is concerned essentially with the production of butyl rubber, in view of the industrial interest in this substance, it will be easy for the expert on the subject of using the catalyst system described herein, to find the ideal conditions for the copolymerization of different monomers.

In particular, the usable mono-olefins may include a number having from 4 to 7 carbon atoms ($C_4$–$C_7$), while the multiolefins are generally constituted by diolefines conjugated with from 4 to 14 carbon atoms ($C_4$–$C_{14}$), such as isoprene, butadiene, 2,3-dimethyl-1,3-butadiene, while examples of the first may be isobutene; 2-methyl butene-1, 3-methyl-butene-1, 2-methyl-butene 2, 4-methyl-pentene-1. As we have mentioned, only great industrial interest has caused us to limit our examples to the case of butyl rubber, that is, to the copolymerization of isobutylene and isoprene in quantities ranging from 90 to 99.5% in isobutylene by weight and from 10 to 0.5% in isoprene by weight.

The reaction media used are those which are normally used in the technique, and that is, ethyl chloride, methyl chloride, or methylene chloride. Hydrocarbon compositions may also be used as long as they are liquid at the temperature of reaction, such as for example, pentane, isopentane, n-heptane, cyclohexane, or even solvents maintained in a liquid phase at the temperature of reaction, such at the monomer or the monomers used.

The molecular weights of the product obtained vary over a considerable range according to the conditions adopted.

The catalyst system of the invention includes:

(a) a metalorganic compound of aluminum represented by the formulae $AlR_4$ or $AlR_2 X$ where X is an atom of halogen and R is a hydrocarbon radical with a number of carbon atoms varying from 1 to 10, or hydrogen;

(b) a haloid of an inorganic acid represented by the general formula $Z_nMeX_mY_p$ in which Me is an element of the 5°, 6° and 7° group of the periodic system; $n$, $m$ and $p$ are whole numbers where $p$ can be zero and the sum $2n+m+p$ is equal to the valency of the element in the composition used; Z is oxygen or sulphur; X is an atom of halogen; Y is an organic residue corresponding to typical organic functions such as for example, of the alkylic type (R), arylic, (Ar), cycloarylic (—C), etheric (—Or), esteric (—OCOR), amminic (—NR$_2$), acetylacetonic (—COCH$_2$COR), oximic (—C=NOH) etc., variably substituted. Typical examples of these catalysts are:

$SO_2Cl_2$, $SOBr_2$, $SOCl_2$, $CrO_2Cl_2$, $SO_2Br_2$, $VOCl_3$, $VO(OR)Cl_2$, $VO(OR)_2Cl$, $VOCl_2$, $NOCl$, $S_2Cl$, $C_6H_5$ $POCl_2$, $POCl_3$, $PSCl_3$, $VO(NR)_2Cl_2$, $AsOCl_3$, $SbOCl_3$, $BiOCl_3$, $MoO_2F_2$, $SeOCl_2$, $UO_2$, $Cl_2$, $UO_2F_2$, $Sb-(C_6H_5)_2OBr$, $Sb(C_6H_5)OBr_2$, $As(C_6H_5)OCl_2$, $(C_6H_5)SO_2Cl$, $RSO_2Cl$, $ClSO_2NCO$, $Cl_3$, $CSO_2Cl$.

The catalyst may be preformed or prepared on the spot by slowly adding the co-catalyst used in the same reaction environment and in any event the molar ratio between the total quantity of the compound (b) and the compound (a) is less than 1 and preferably between 0.5 and $10^{-4}$.

The polymerization reaction according to our invention is conducted at a temperature between $-100$ and $+30°$ C. inclusive.

The molecular weights of the polymers prepared in the following examples were obtained through viscosimetric measures of polymer solutions in cyclohexane at 30° C. After having determined the intrinsic viscosity by extrapolation at C=0 of the curves $\ln\eta_a/C$ and $\eta_{sp}/C$, the average molecular weight of the single polymers was calculated according to the following equation:

$$\ln M_a = 11.98 + 1.452 \ln[\eta]$$

The invention is more easily comprehensible from the examination of the following examples to which, it should not be taken as limited.

EXAMPLE 1

We used a completely glass tubular reactor having a capacity of 300 cm.$^3$, having a mechanical agitator and a thermometric sheath, previously desiccated by heating under a sustained dry Argon flow, during the execution of the experiment, under a slight positive pressure of Argon (20–30 torr in respect to the atmospheric pressure).

In this apparatus, we condensed 80 cm.$^3$ of $CH_3Cl$ and then we introduced 28.4 grams of isobutylene, 0.84 grams of isoprene and 1mmole (cc. 0.127) of $AlEt_2Cl$ maintaining the temperature at $-40°$ C. by means of a thermostatic bath. To the reaction mixture we subsequently added while shaking heavily 0.03 mmoles of $SO_2Cl_2$ dissolved in 5 cc. of $CH_3Cl$ graduating the addition over a period of 5 minutes for which we ascertained a 5° C. increase in temperature. We continued the shaking for 10 minutes after we finished adding, then we stopped the reaction by adding methanol to the suspension of the polymers produced. We obtained 9.9 grams of dry polymer (Yield= 34.8%) which presented a $[\eta]$ equal to 1.55 dl./g., determined in cyclohexane, which corresponded to an average viscometric PM equal to 290,000 and a content of unsaturation, determined iodometrically, corresponding to 2.70% in isoprene weight.

The polymer obtained is made to undergo vulcanization in slit plates using a mixture of the following composition prepared on an open cylinder mixer:

| | Parts |
|---|---|
| Polymers | 100 |
| EPC black | 50 |
| Antioxidant 2246 | 1 |
| $Z_nO$ | 5 |
| Stearic Acid | 3 |
| Sulphur | 2 |
| MBTDS (mercapto-benzothiazoledisulphide) | 0.5 |
| TMDT (tetramethyl-thiuramedisulphide) | 1 |

The mixture was vulcanized at 153° C. for 40 and 60 minutes. The properties of the vulcanization obtained are included in Table 1; Table 2 shows as a means of comparison, the properties of a typical sample of commercial butyl rubber determined under the same conditions.

TABLE 1

| | | |
|---|---|---|
| Vulcanization time (minutes) | 40 | 60 |
| Modulus at 100% (kg./cm.$^2$) | 17 | 18 |
| Modulus at 200% (kg./cm.$^2$) | 29 | 35 |
| Modulus at 300% (kg./cm.$^2$) | 53 | 62 |
| Breaking load (kg./cm.$^2$) | 221 | 222 |
| Elongation at break (percent) | 705 | 680 |
| Permanent set (percent) | 26 | 25 |

TABLE 2

| | | |
|---|---|---|
| Vulcanization time* (minutes) | 40 | 60 |
| Modulus at 100% (kg./cm.$^2$) | 15 | 16 |
| Modulsu at 200% (kg./cm.$^2$) | 27 | 33 |
| Modulus at 300% (kg./cm.$^2$) | 47 | 58 |
| Breaking load (kg./cm.$^2$) | 209 | 210 |
| Elongation at break (percent) | 715 | 650 |
| Permanent set (percent) | 29 | 29 |

*Butyl rubber Enjay B218 with viscosimetric molecular weight equal to about 450,000 and unsaturation contents corresponding to 2.15% in isoprene weight.

The results obtained showed that the polymer obtained in this experiment, conducted at a temperature included between $-35$ and $-40°$ C. presented at the vulcanization, properties very similar to those of commercial butyl rubber, which, as it is well known, was produced at a temperature of about equal to $-100°$ C.

EXAMPLE 2

The experiment described in Example 1 was repeated with the difference that we used as a co-catalyst a solution containing 0.05 mmoles of $SOCl_2$ in 5 cm.$^3$ of $CH_3Cl$. The experiment was conducted at a temperature of $-40°$ C. and the addition of the co-catalyst was executed in a time of 6 minutes for which we had an increase in temperature of 2° C. We obtained 6.8 g. of dry polymer (yield=24%) which presented a $[\eta]$ equal to 1.64 dl./g. ($PM_v$=320,-000), and an unsaturation content corresponding to 3.1% of isoprene weight. The polymer was vulcanized according to the methods described in Example 1 and the properties of the vulcanized products obtained were similar to those reported in Table 1.

EXAMPLE 3

With the same methods reported in Example 1, we introduced into the reactor the same quantities of solvent, monomers and 2 mmoles (cc. 0.254) of $AlEt_2Cl$. The reaction was set off at the T of $-35°$ C. through gradual introduction of a solution of 0.05 mmoles of $CrO_2Cl_2$ in $CH_3Cl$ for a period of five minutes, during which we obtained a temperature increase of 2° C. We obtained 11.6 g. of dry polymer (yield=40.8%) having $[\eta]$=1.87 dl./g.

($PM_v$=380,000) and an isoprene content equal to 2.5% by weight. The properties of the polymer were similar to those reported for the sample in Example 1.

EXAMPLE 4

We repeated the experiment as per the one described in the preceding example, with the difference that we operated at the temperature of −40° C. and we used as a co-catalyst a solution containing 0.1 mmole of VO$(O_n.C_4H_9)Cl_2$ in $CH_3Cl$. The addition was executed gradually for a period of 9 minutes while shaking heavily and an increase of temperature in the amount of 4° C. was verified. The reaction was extinguished after another 10 minutes of shaking and we obtained a polymer that, after drying, weighed gr. 20.65 (yield=72.8%). The polymer presents an $[\eta]$=1.84 dl./g. (corresponding to an average viscosimetric PM equal to 372,000) and unsaturation content corresponding to 3.0% in isoprene weight.

The sample supplied an average molecular weight value in number of $\overline{M}_n$, equal to 147,000 determined through app. Mechrolab. Mod. 502.

The sample was examined with an apparatus GPC (model 200) (Waters Assoc.) using as a solvent trichlorobenzole at a temperature of 130° with the purpose of being able to obtain from it the distribution curve of the molecular weights.

We obtained a monomodal curve of the molecular weight distribution from which we obtained a value of $\overline{M}_w/\overline{M}_n$=2.97.

The same determination executed on various commercial samples of butyl rubber supplied us with values of $$\overline{M}_w/\overline{M}_n$$

included between 2.1 and 2.6.

EXAMPLE 5

With the same experimental technique previously described and using the same quantities of reagents, we used cc. 0.127 (1 mmole) of $AlEt_2Cl$ and 0.25 mmoles of VO $(OC_2H_5)_2Cl$ dissolved in 5 cc. of $CH_3Cl$. The addition of the co-catalyst was executed slowly during a period of 7 minutes at a temperature of −40° C., for which we obtained a temperature increase in the amount of 2° C. We continued the reaction for another ten minutes for which we obtained the formation of 6.03 g. of dry polymer (yield=21.2%) with an $[\eta]$=1.68 dl./g. ($PM_v$=330,000) and a content of unsaturation corresponding to 2.14% b.w. of isoprene.

EXAMPLE 6

We used the same quantities of reagent as described in the previous example with the difference that we used 2 mmoles of $Al(isobutyl)_2Cl$ and, as a co-catalyst a solution containing 0.15 mmole of VO $(O_n.C_4H_9)Cl_2$ in 5 cc. $CH_3Cl$. The reaction was conducted at a temperature of −40° C. and the addition of the co-catalyst was executed in a period of six minutes for which we had an increase of temperature corresponding to 7° C. We obtained 18.2 gr. of dry polymer (yield=64.1%) having $[\eta]$=1.48 dl./g. corresponding to an average viscosimetric molecular weight of 270,000 an unsaturation content equal to 3.1% of isoprene weight and physical characteristics similar to the sample reported in Example 1.

EXAMPLE 7

We repeated the experiment described in the previous example with the difference that we used cc. 0.127 (1 mmole) $AlEt_2Cl$ and 0.05 mmoles of $VOCl_3$ dissolved in 5 cc. of $CH_3Cl$.

We added the co-catalyst at a temperature of −40° C. for a period of 8 minutes for which an increase of 3° C. was obtained. We obtained 14.2 g. of dry polymer (yield =50%) having an $[\eta]$=1.87 dl./g. ($PM_v$=380,000) and an unsaturation content equal to 2.0% of isoprene weight. The characteristics of the product were similar to those reported for the sample in Example 1.

Operating under the same above described conditions, and with the same quantity of reagent, but without using the $AlEt_2Cl$, we had no formation of polymer. Besides, also using a quantity of $VOCl_3$ corresponding to five times the quantity used above, but without using $AlEt_2Cl$, no formation of polymer was obtained. These results proved that the $VOCl_3$ is not capable of beginning the polymerization by itself under our experimental conditions.

EXAMPLE 8

We repeated the previously described experiment with the difference that we used 2 moles of $AlEt_2I$ and 0.3 mmoles of VO $(O_n.C_4H_9)Cl_2$ as a co-catalyst. The addition of a co-catalyst was carried out at the temperature of −40° C. during 2 minutes for which a temperature increase of 2° C. was obtained.

We obtained 2.6 g. of dry polymer (yield=9.15%) having an average viscosimetric molecular weight equal to 120,000 and an unsaturation content equal to 2.8% of isoprene weight.

EXAMPLE 9

We operated as described in the previous example with the difference that we used as catalyst 2 mmoles of $AlEt_2Br$ and as co-catalyst a solution of 0.3 mmoles of $VO(O_nC_4H_9)Cl_2$ in 5 cc. of $CH_3Cl$.

We carried out the addition at the temperature of −40° C. for a period of 7 minutes for which we obtained a temperature increase in the amount of 2° C. We obtained 12.15 g. of dry polymer (yield=42.7%) having $[\eta]$=1.52 dl./g. ($PM_v$=280,000) and an unsaturation content equal to 2.45% in isoprene weight.

EXAMPLE 10

We repeated the previous experiment with the difference that we used 2 mmoles of $AlEt_2I$ as a catalyst and 0.3 mmoles of $SO_2Cl_2$ as a co-catalyst.

We carried out the addition slowly at a temperature of −40° C. for a duration of two minutes during which we obtained a temperature increase in the amount of 1° C. and we permitted the reaction to continue for another 40 minutes. We obtained 4.54 g. of dry polymer (yield =16.0%) having an average viscosimetric PM equal to 94,000 and an unsaturation content corresponding to 3.2% of isoprene weight.

We claim:
1. Process for the production of butyl rubber through the copolymerization of isobutylene and isoprene wherein the improvement comprises conducting the copolymerization reaction in the presence of a catalyst system consisting essentially of:
 (a) a metalorganic composition of aluminum represented by the formula $AlR_3$ or $AlR_2X$ wherein X is an atom of halogen, and R is a hydrocarbon radical having from 1 to 10 carbon atoms, or hydrogen;
 (b) a haloid of an inorganic acid represented by the general formula $Z_nMeX_mY_p$ in which Me is an element belonging to the 5°, 6° or 7° group of the periodic system; $n$ and $m$ are whole numbers; $p$ is a whole number or zero and the sum $2n+m+p$ is equal to the valency of said element; Z is oxygen or sulphur; X is a halogen atom; Y is an organic residue selected from the alkylic, arylic, cyclohexylic, etheric, esteric, ammidic, acetylacetonic and oximic functional groups; and wherein the molar ratio of compound (b) to compound (a) is between 0.5 and $10^{-4}$.

2. Process according to claim 1, wherein the polymerization reaction is effected in a reaction medium selected from the aliphatic, aromatic, cycloaliphatic and mono- or poly-halogenated hydrocarbons.

3. Process according to claim 2, wherein the reaction medium is methyl chloride.

4. Process according to claim 1, wherein the polymerization reaction is conducted at a temperature between —100 and +30° C. inclusive.

5. Process according to claim 1, wherein the isobutylene and the isoprene are fed in variable quantities ranging from 90 to 99.5% of isobutylene by weight, and from 10 to 0.5% of isoprene by weight.

References Cited

UNITED STATES PATENTS

| 3,231,547 | 1/1966 | Darcy et al. | 260—85.3 R |
|---|---|---|---|
| 2,581,154 | 1/1952 | Walsh, Jr., et al. | 260—85.3 R |
| 2,931,791 | 4/1960 | Ernst et al. | 260—85.3 R |

JOSEPH L. SCHOFER, Primary Examiner

A. HOLLER, Assistant Examiner

U.S. Cl. X.R.

260—79.5 C, 85.3 C, 94.8